Dec. 25, 1923.

S. COOPER 1,478,869

NUT TREATING MACHINE

Filed April 4, 1919

6 Sheets-Sheet 1

Dec. 25, 1923.

S. COOPER 1,478,869

NUT TREATING MACHINE

Filed April 4, 1919

6 Sheets-Sheet 3

Inventor
Simon Cooper
By his Attorney
Frank J. Kent

Dec. 25, 1923.

S. COOPER 1,478,869

NUT TREATING MACHINE

Filed April 4, 1919

6 Sheets-Sheet 4

Inventor
Simon Cooper
By his Attorney
Frank J. Kent

Dec. 25, 1923.

S. COOPER 1,478,869

NUT TREATING MACHINE

Filed April 4, 1919    6 Sheets-Sheet 5

Inventor
Simon Cooper
By his Attorney
Frank J. Kent

Dec. 25, 1923.
S. COOPER
1,478,869
NUT TREATING MACHINE
Filed April 4, 1919    6 Sheets-Sheet 6
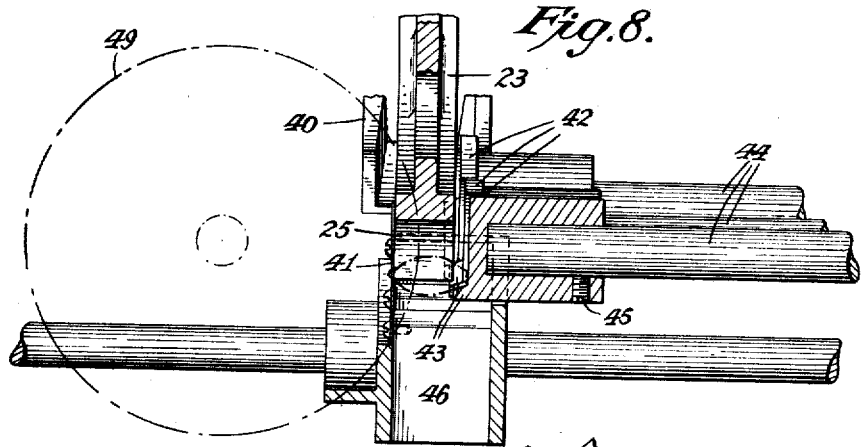
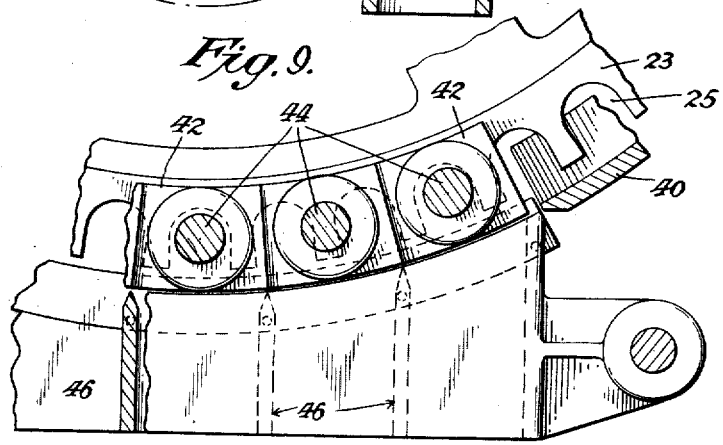
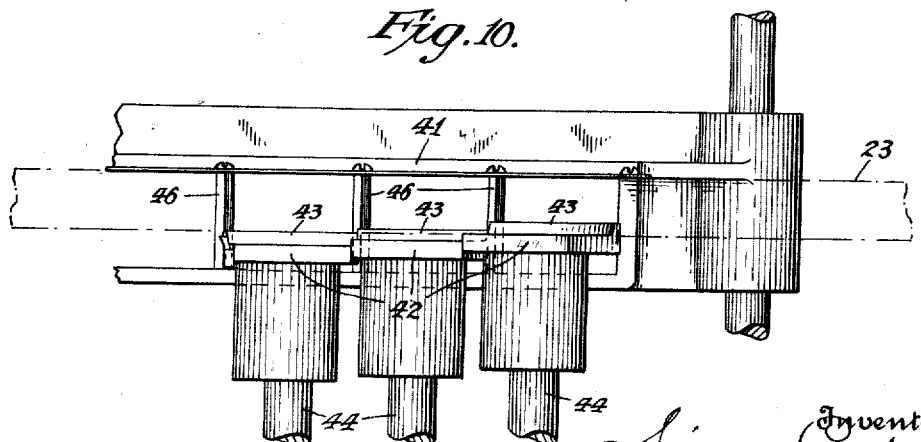

Patented Dec. 25, 1923.

1,478,869

UNITED STATES PATENT OFFICE.

SIMON COOPER, OF NEW YORK, N. Y., ASSIGNOR TO THE FRANKLIN BAKER COMPANY, OF PHILADELPHIA, PENNSYLVANIA, A CORPORATION OF PENNSYLVANIA.

NUT-TREATING MACHINE.

Application filed April 4, 1919. Serial No. 287,457.

*To all whom it may concern:*

Be it known that I, SIMON COOPER, a citizen of the United States, residing at New York, in the county of New York and State of New York, have invented certain new and useful Improvements in Nut-Treating Machines, of which the following is a specification.

This invention relates to the treatment of nuts preparatory to the cracking process. It has been found that nuts and particularly those in which the kernels are symmetrical, will crack with the least distortion and least injury to the kernels, if the crushing pressure is applied parallel to the major axis of the nut. The poles or ends of the nut shells are usually quite dense and fibrous and in practice the cracking of the shells is materially facilitated by breaking down or weakening these fibrous ends of the shells.

The purpose of the present invention is to provide relatively simple and effective mechanism for thus preparing the nuts for the cracking or opening process and further to provide practical and efficient means for grading the nuts.

Briefly, the invention resides in a combination of elements, including means in the nature of a "sorting" device for positioning the nuts in a predetermined order, means for applying endwise pressure to the nuts and means for transferring the nuts from the said positioning means to said pressure-applying means. A device for grading the compressed nuts according to length is usually associated with the transferring means and so arranged as to receive the nuts therefrom.

Other features and details of the invention will appear as the specification proceeds.

In the accompanying drawings I have illustrated the invention embodied in only one of its practical forms, it being understood that the invention is susceptible of such changes and modifications as come within the spirit and scope of the appended claims.

Figure 1:
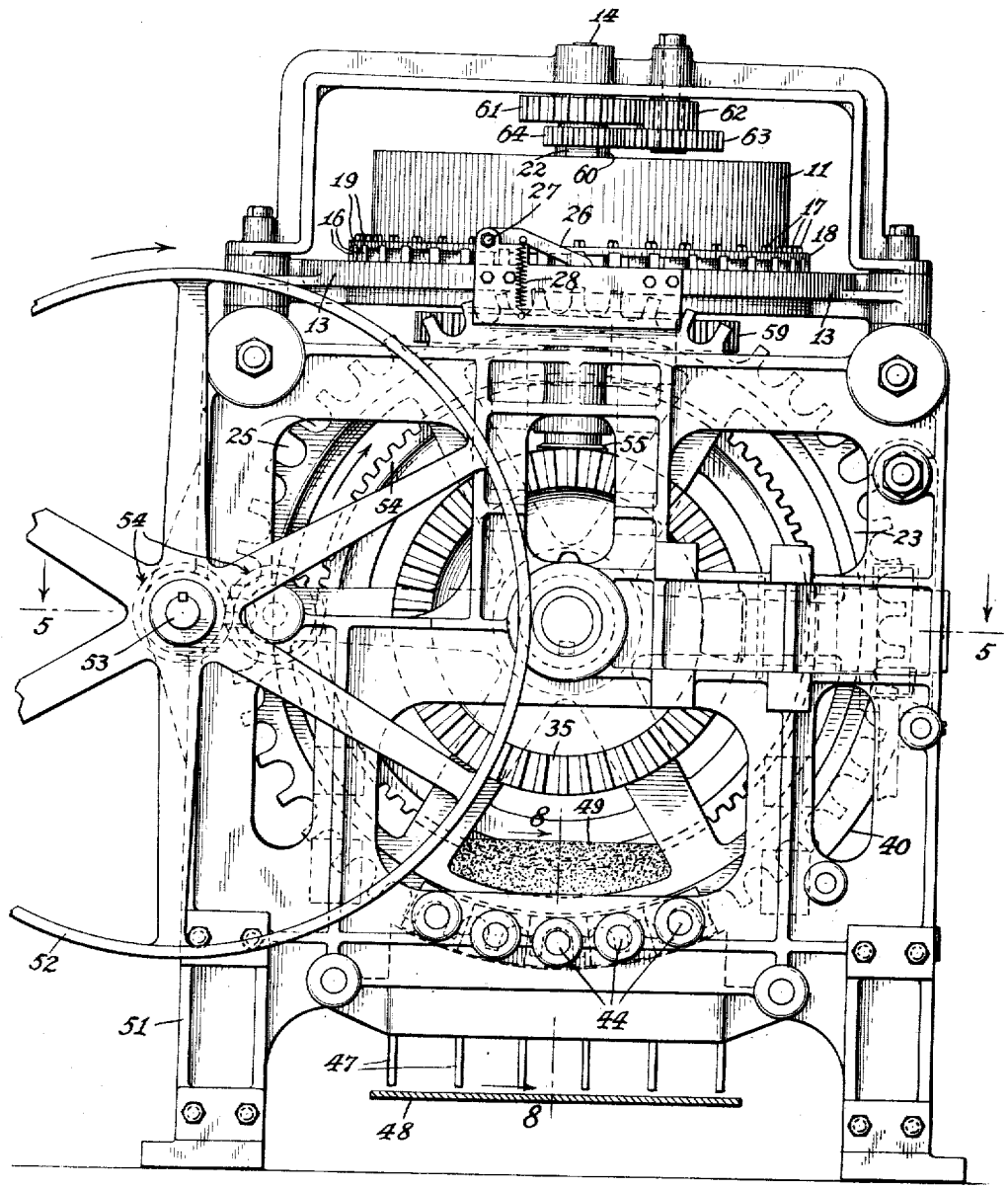
Figure 2:
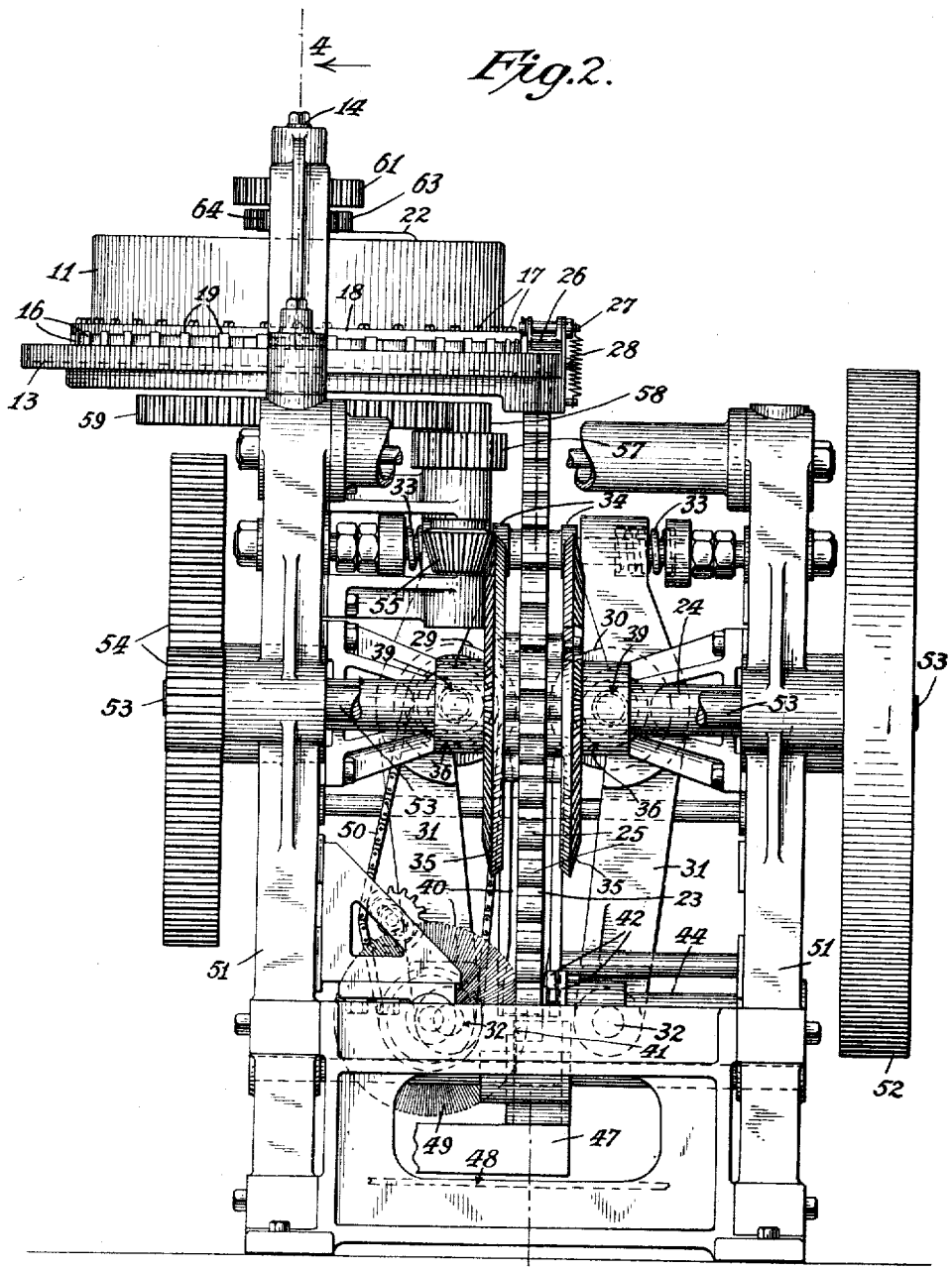
Figure 3:
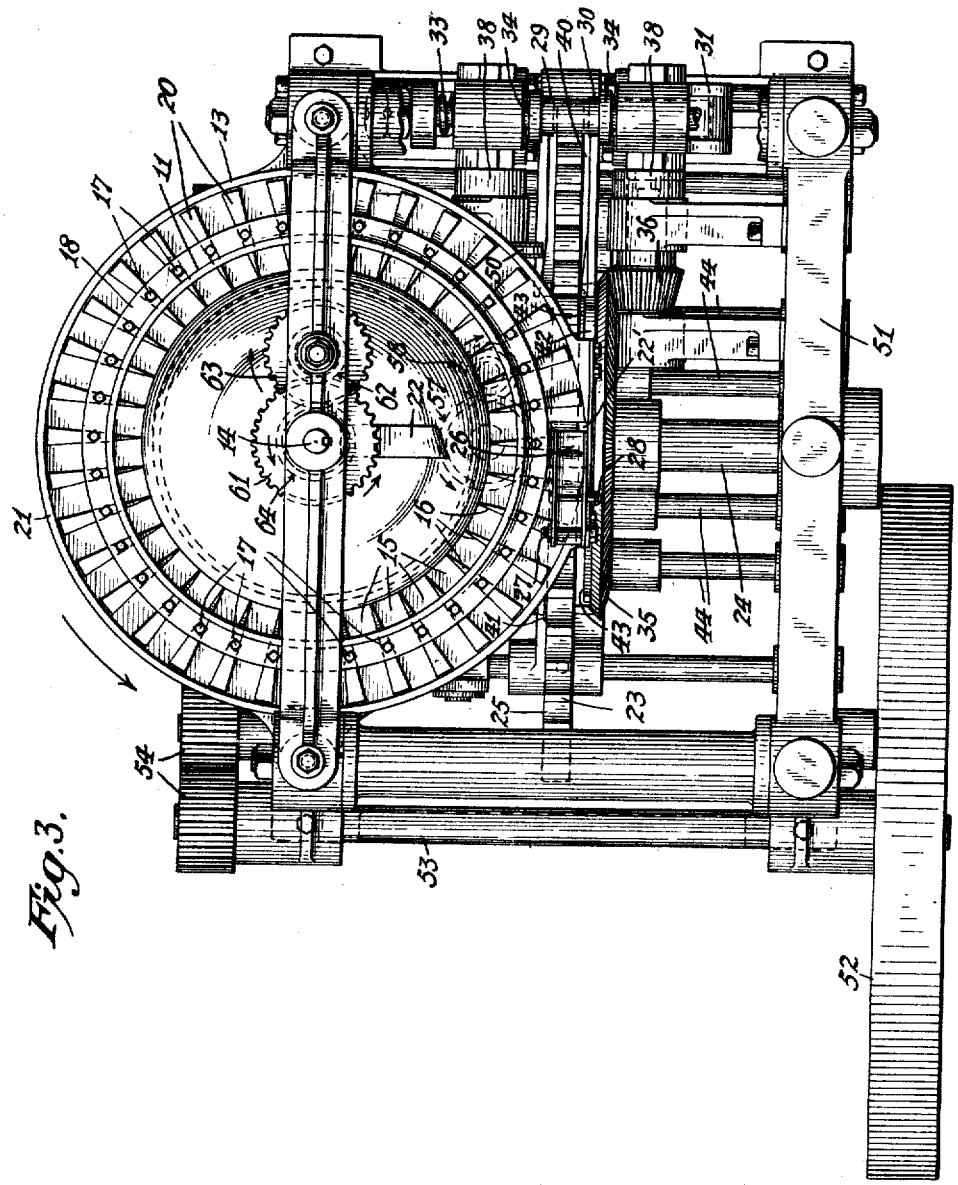
Figure 4:
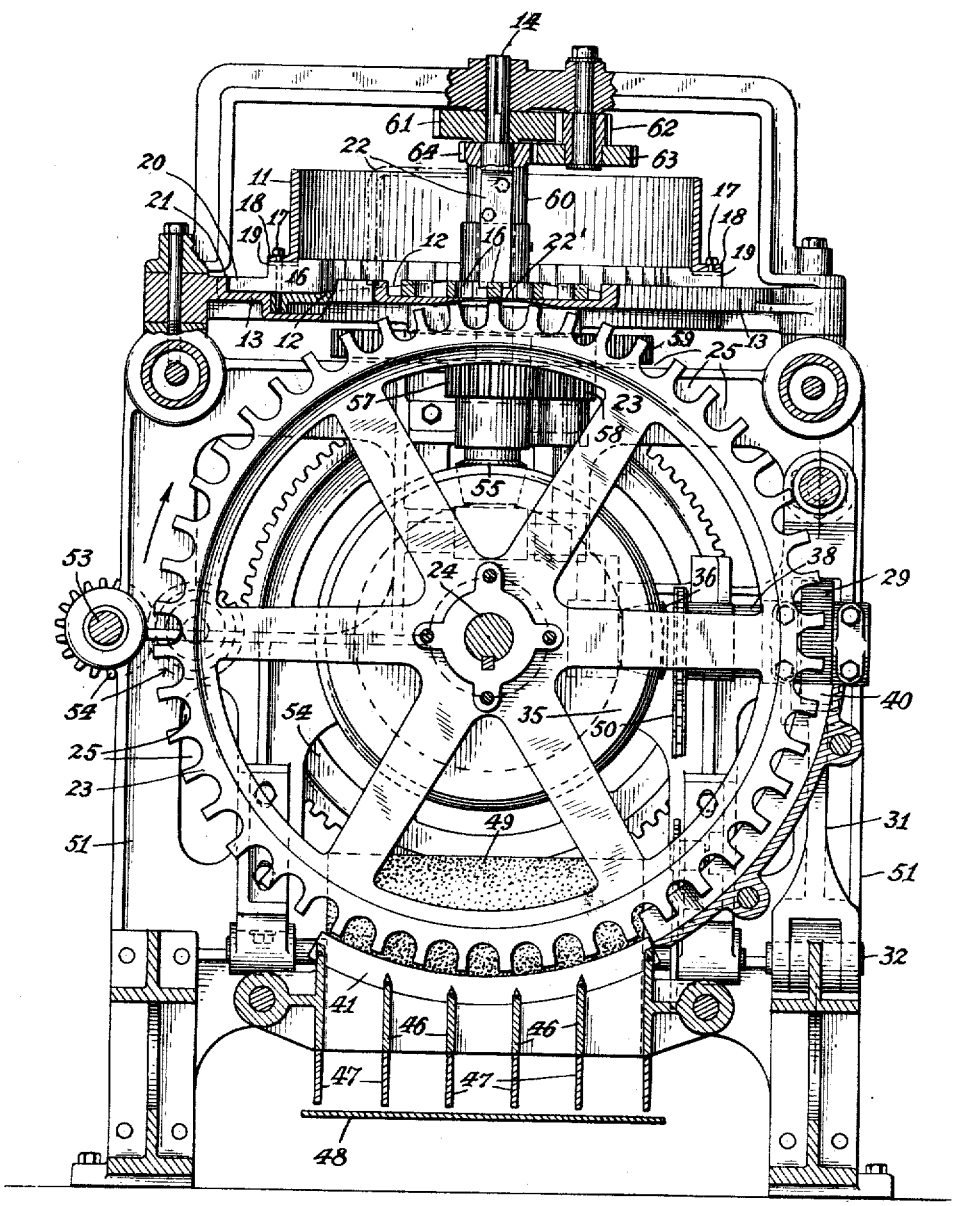
Figure 5:
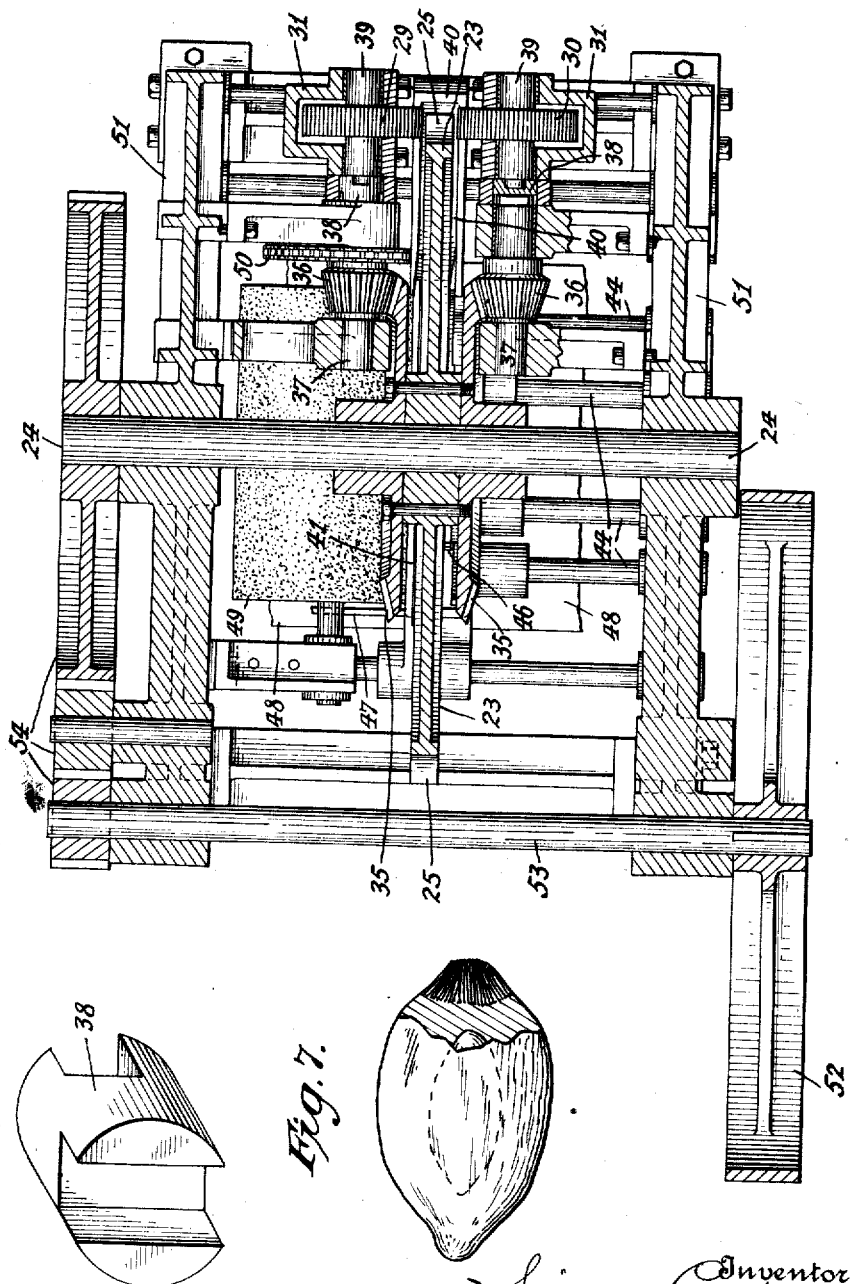
Figure 6:
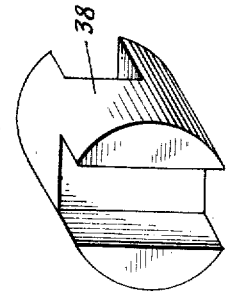
Figure 7:
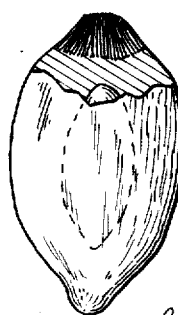

In said drawings, Figure 1 is a front elevation of the machine; Figure 2 is an elevation taken from the left-hand side of Figure 1; Figure 3 is a plan view with parts shown dotted; Figure 4 is a vertical sectional view taken substantially on the plane of line 4—4 of Figure 2; Figure 5 is a horizontal sectional view taken substantially on the plane of line 5—5 of Figure 1; Figure 6 is a detail view of the universal joint coupling for one of the compressing rollers; Figure 7 is a broken sectional view of a typical nut to be treated, illustrating one of the fibrous ends thereof; Figure 8 is a broken vertical section of a part of the grading device; Figures 9 and 10 are vertical section and broken plan views of the same.

11 designates the hopper of the machine, consisting in the present disclosure of an annular upstanding rim (Figure 4) and a bottom 12, inclined from the central portion toward the rim thereof. This hopper is supported substantially horizontal above a table 13, on a shaft 14 and is provided in its peripheral portion with radially extending passages 15. These passages are of a width to take the nuts when arranged on their longitudinal axes and are each of a length to contain a series of two or more longitudinally disposed nuts. Said passages are provided in the present instance by the spaced inwardly tapered fingers 16, clamped by the bolts 17, between the flange 18 of the side wall of the hopper and the bottom of the hopper and set in spacing notches 19 in the underside of said flange. These fingers have projecting portions 20, substantially the length of a nut, extending beyond the rim of the hopper and arranged to traverse the surrounding portion of the table, which is provided with an annular shoulder 21, at the ends of the fingers forming a wall for confining the nuts between such projecting fingers against further outward movement.

An agitator 22 is provided within the hopper which tends to throw the nuts outward into the positioning channels described and this outwardly flowing movement is facilitated by the rotation of the hopper, and by the downwardly sloping construction of the hopper bottom. In this way the nuts are positioned with their longitudinal axes radially aligned and the outermost one of each series of such radially aligned nuts is carried along over the table top between the projecting portions of the fingers. A discharge opening 22' is provided in the table top in line with the projecting portions of the fingers and as the hopper rotates the nuts drop one at a time through this opening into pockets provided in a feed wheel.

23 designates the feed wheel, mounted on the horizontal shaft 24 and provided in its rim with a series of open-ended pockets 25, each of a length somewhat less than the length of the nuts handled, so that the ends of said nuts, when in place therein will project beyond the opposite faces of the wheel. This feed wheel or transfer device is mounted beneath the table, in the plane of the discharge opening and is rotated in proper time to bring the pockets therein into register with the extended channels of the hopper. The transfer of the nuts from the extended channels, through the discharge passage into the pockets in the feed wheel is facilitated and positively insured by a pusher or ejector 26, pivoted at 27 over the projecting ends of the fingers and actuated by a spring 28 to thrust the nuts down out of the channels into the pockets in the feed wheel.

The compressing means consists in the present disclosure of a pair of rollers 29—30 disposed at opposite sides of the feed wheel, said rollers having roughened active faces (Figure 5) in line with the open-ended pockets in the feed wheel and arranged to operate on the ends of the nuts protruding beyond the opposite faces of the wheel. These rollers are made to exert a yielding crushing pressure on the ends of the nuts by mounting them in swinging brackets 31, pivoted at 32 and acted on by springs 33. Stops 34 are provided to limit the movement of the brackets toward the feed wheel to prevent contact of the pressure rollers with the feed wheel.

The pressure rollers are positively driven, preferably in the direction of rotation of the feed wheel, by means here consisting of bevel gears 35 on the feed wheel shaft, meshing with bevel pinions 36, on the shafts 37, which are connected by universal joint couplings 38, with the shafts 39, on which the rollers are mounted. This construction enables the pressure rollers to adjust themselves to nuts of different length and to apply substantially uniform pressure to the nuts of different size, and provides for the continuous rotation of the rollers during the lateral adjusting movements thereof.

Upon leaving the pressure-applying means, the end-compressed nuts are carried by the feed wheel, down through a segmental guide chute 40, which confines the nuts in the open pockets and guides them onto the grading device.

The grading device, which appears most clearly in Figure 4 and is shown in detail in Figures 8, 9 and 10, consists of a passageway in line with and forming a continuation of the guide chute and having grading pockets of different length in the bottom thereof. These pockets are formed in the illustration by a relatively straight wall 41, constituting one side of the passageway and laterally offset abutments 42, with supporting flanges 43, opposite said wall and providing, with said wall, tracks on which the nuts ride (Figure 8). These abutments are supported by the rods 44, on which they are laterally adjustable, being secured in adjusted position thereon as by means of the set screws 45, shown in Figure 8. It will be clear that as the nuts in their course of travel, reach grading pockets of the corresponding length they will fall through and hence be separated according to length. Partitions 46 are provided, in line with the pockets of different length and beneath these partitions and forming in effect continuations thereof, are the partitions 47, over the conveyor belt 48, which carries the graded nuts off to the cracking machine or other place.

The grading action is made more accurate and certain, in the illustration, by a brush 49, rotating downwardly against the lower face portion of the feed wheel, above the straight supporting track 41. This brush is shown driven by a sprocket chain 50 from the drive shaft 37 of the compression rollers and serves, as will be clear from Figure 8, to force the nuts over against the offset abutments 42, which thus serve as gages, and to brush the nuts downward into the pockets, as soon as they reach the pockets of the right length.

The parts are mounted in a suitable framing 51 and is provided for driving the various parts of the machine. In the illustration power is applied by means of a pulley 52 on shaft 53, which is connected by speed-reduction gearing 54, with the feed wheel shaft 24. The hopper is rotated from the feed wheel shaft by a bevel pinion 55 in mesh with the bevel gear 35 on said shaft, said pinion being carried by the lower end of a vertical shaft 56, whose upper end carries a gear 57, in mesh with a double-width pinion 58, which engages a gear 59 on the hopper shaft 14. The stirrer is shown as carried by a sleeve 60 rotatably engaged on the shaft 14 and as operated by means of a gear 61, on the hopper shaft, meshing with a pinion 62, carrying the gear 63, in mesh with a pinion 64, provided on the upper end of the sleeve 60.

I claim:—

1. In a machine of the character described, means at a relatively fixed station for applying endwise pressure to nuts, and a constantly moving feed wheel for transferring nuts to said pressure-applying means provided with pockets supporting the nuts with their ends protruding for engagement by said pressure-applying means as they are carried therebetween.

2. In a machine of the character described, means at a relatively fixed station for applying endwise pressure to nuts, a constantly moving feed wheel for transferring nuts to said pressure-applying means provided with pockets supporting the nuts with their ends protruding for engagement by said pressure-applying means as they are carried therebetween, and means for automatically placing the nuts in the pockets of said feed wheel.

3. In combination, means for positioning nuts on their longitudinal axes, a constantly moving transfer device provided with pockets to receive the thus-arranged nuts and means at a relatively fixed station and disposed on opposite sides of the transfer device for applying endwise pressure to the nuts as they are advanced therebetween by said transfer device.

4. In combination with a feed wheel having open-ended pockets disposed substantially parallel to the axis of the wheel compressing rollers at opposite sides of the wheel in line with said pockets and in the path of and adapted to operate on the protruding ends of nuts seated in said pockets.

5. A combination like that set forth in claim 4 wherein the compressing rollers are positively driven and are relatively yieldable to adjust themselves to different lengths of nuts.

6. In a nut-compressing machine, a feed wheel having open-ended nut-supporting pockets in the peripheral portion thereof and positively driven compressing rollers at opposite sides of said wheel in line with the pockets therein.

7. In a nut-compressing machine, a feed wheel having open-ended nut-supporting pockets in the peripheral portion thereof and positively driven compressing rollers at opposite sides of said wheel in line with the pockets therein, and a confining guide surrounding a portion of said wheel at one side of the compressing rollers.

8. In a machine of the character described, means for arranging nuts with their longitudinal axes on radial lines, oppositely disposed compressing rollers and a continuously moving feed device for advancing the thus-arranged nuts between said compressing means.

9. In a nut-compressing machine, a rotary sorting device having a plurality of radial channels, a feed wheel having pockets to register with said channels and compressing rollers disposed at opposite sides of said feed wheel and in line with the pockets therein, said rollers adapted to act on the nuts as they are advanced therebetween by the feed wheel.

10. In a machine of the character described, a rotary hopper having radial sorting channels, a feed wheel rotating at an angle to said hopper and having pockets registering with said sorting channels and rotatable compressing means at opposite sides of the feed wheel in alignment with the pockets therein and arranged to operate on nuts in the pockets of said feed wheel as they are carried therebetween by the feed wheel.

11. A combination like that of claim 10 wherein the compressing means consists of rollers at opposite sides of the feed wheel rotating at an angle to the axis thereof.

12. A combination like that of claim 11 wherein the compressing rollers rotate in the same direction with the feed wheel.

13. In combination, a hopper having radial outlet passages, a closure for said passages having a discharge opening therein, and a feed device traversing said opening.

14. In combination, a table having a discharge opening therein, a rotary hopper over said table and having spaced radial fingers traversing said discharge opening, an annular confining shoulder at the outer end of the radial fingers limiting outward movement of the articles therebetween, and a feed wheel beneath the table having pockets registering with said discharge opening.

15. In combination, a rotary hopper having a bottom inclined from the central portion toward the rim thereof and provided at the rim with spaced radial fingers projecting beyond the bottom of the hopper, a table beneath the projecting portions of said fingers provided with a discharge opening and with an annular confining wall at the ends of said fingers, and a feed device beneath the table and traversing the discharge opening therein.

16. In combination, a rotary hopper having a bottom inclined from the central portion toward the rim thereof and provided at the rim with spaced radial fingers projecting beyond the bottom of the hopper, a table beneath the projecting portions of said fingers provided with a discharge opening and with an annular confining wall at the ends of said fingers, a feed wheel having pockets registering with said discharge opening, and a compressing means in the path of travel of said feed wheel.

17. In combination, a feed wheel provided with pockets, compressing rollers at opposite sides of said wheel in line with said pockets, means for yieldingly supporting said rollers, and means for driving said rollers including universal connections allowing for the yielding movements of the rollers.

18. In combination, a feed wheel provided with pockets, compressing rollers at opposite sides of said wheel in line with said pockets, movable supports for said rollers, springs acting on said supports to thrust the rollers toward the feed wheel and stops limiting the movement of said supports to prevent contact of the rollers with the feed wheel.

19. In a machine of the character described, a feed wheel provided with pockets, means for positioning nuts in said pockets, a grading device arranged to receive nuts from said pockets, and means for brushing the nuts from said pockets into said grading device.

20. In a machine of the character described, a feed wheel provided with pockets, means for positioning nuts in said pockets, a grading device arranged to receive nuts from said pockets, and provided with a series of receiving pockets independently adjustable to various lengths.

21. In a machine of the character described, a feed wheel provided with pockets, means for positioning nuts in said pockets, a grading device arranged to receive nuts from said pockets, said grading device having a series of successively arranged pockets independently adjustable to various lengths and a conveyor receiving the graded nuts from said pockets.

22. In a machine of the character described, a feed wheel provided with pockets, means for positioning nuts in said pockets, a grading device arranged to receive nuts from said pockets, and a brush for stripping the nuts from the pockets into said grading device.

23. In a machine of the character described, grading pockets of different length and a brush at one edge of said grading pockets.

24. In a machine of the character described, a feed wheel having pockets in the periphery thereof, a guide around the rim thereof, grading pockets in line with said guide and a brush at one side of said pockets.

25. In a machine of the character described, a hopper having radial channels each of a length to contain a series of longitudinally aligned nuts, said channels being open at their outer ends for the length of one of said nuts.

26. In a machine of the character described, a hopper having radial channels each of a length to contain a series of longitudinally aligned nuts, and a feed wheel having pockets registering with said channels, and each of the length of one nut.

27. In a machine of the character described, a hopper having radial channels each of a length to contain a series of longitudinally aligned nuts, said channels being open at their outer ends for the length of one of said nuts, and a feed wheel having pockets registering with the open outer ends of the channels.

28. In a machine of the character described, a feed wheel having pockets, means for automatically positioning nuts in said pockets with the ends thereof projecting beyond the sides of said wheel, and oppositely disposed rotary means arranged at a relatively fixed station and in line with the pockets in the feed wheel for subjecting the projecting ends of said nuts to pressure as they are carried therebetween by the feed wheel, said pressure means being of a yielding character to adapt itself to nuts of varying length.

29. In a machine of the character described, means for conveying and end compressing nuts, means for measuring and grading the compressed nuts, and a brush for assisting said grading.

In testimony whereof I affix my signature.

SIMON COOPER.